United States Patent

Houston et al.

[11] 3,946,155
[45] Mar. 23, 1976

[54] OPTICAL SCANNING SYSTEMS

[75] Inventors: John Kenneth Houston, Glasgow; Andrew Simpson Winter, Hardgate, both of Scotland

[73] Assignee: Barr and Stroud Limited, Glasgow, Scotland

[22] Filed: Sept. 5, 1974

[21] Appl. No.: 503,917

[30] Foreign Application Priority Data
Oct. 18, 1973 United Kingdom............... 48482/73

[52] U.S. Cl. .................. 178/7.6; 178/7.1; 178/6.8; 178/DIG. 8; 250/332; 250/334
[51] Int. Cl.² .......................................... H04N 7/18
[58] Field of Search ......... 178/7.6, 7.1, 6.8, DIG. 8, 178/6.7 R, 69.5 F, 7.7; 250/332, 334

[56] References Cited
UNITED STATES PATENTS

| | | | |
|---|---|---|---|
| 3,731,098 | 1/1973 | Hunt | 250/334 |
| 3,804,976 | 4/1974 | Gard | 178/6.8 |
| 3,828,124 | 8/1974 | Baum | 178/7.6 |
| 3,835,249 | 9/1974 | Dattilo | 178/69.5 F |
| 3,886,359 | 5/1975 | Cheek | 250/334 |
| 3,889,117 | 6/1975 | Shaw | 250/332 |

*Primary Examiner*—Howard W. Britton
*Attorney, Agent, or Firm*—Mason, Fenwick & Lawrence

[57] ABSTRACT

An infra-red scanning system with raster scan display unit operating in the visible spectrum, in which the image is scanned across a linear array of detector elements to provide a signal multiplexer with electrical signals related to the detected radiation pattern. The operation of the raster scan display unit is synchronised to the operation of the scanning system so that the horizontal time base integrator is gated according to the speed of the scanning system, and the vertical time base is gated to operate in synchronism with the multiplexer in order to minimise optical distortion in the display.

6 Claims, 6 Drawing Figures

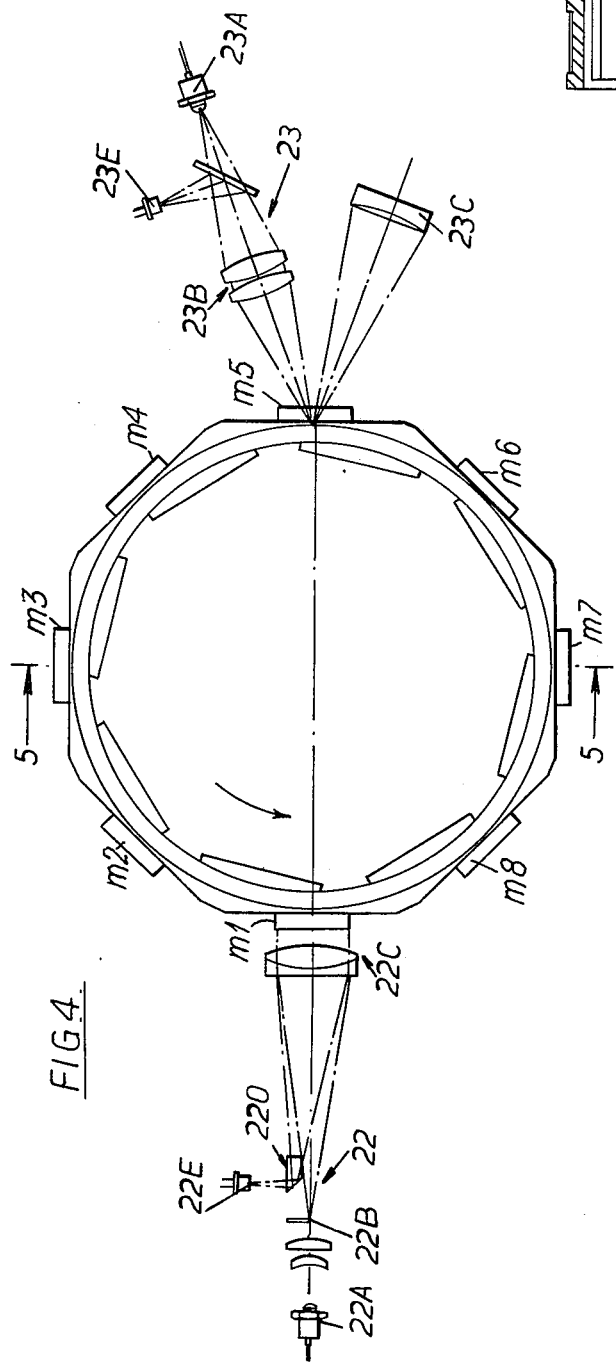
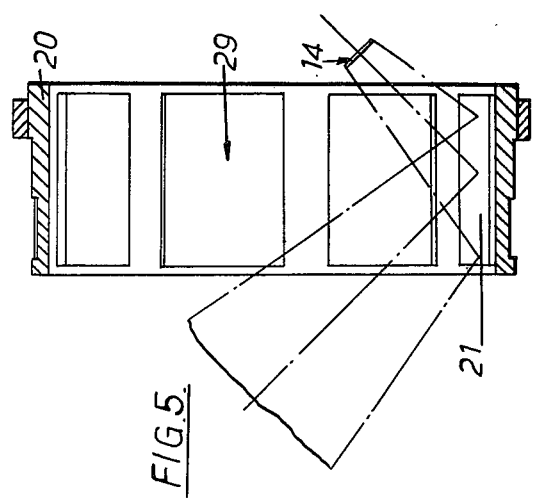

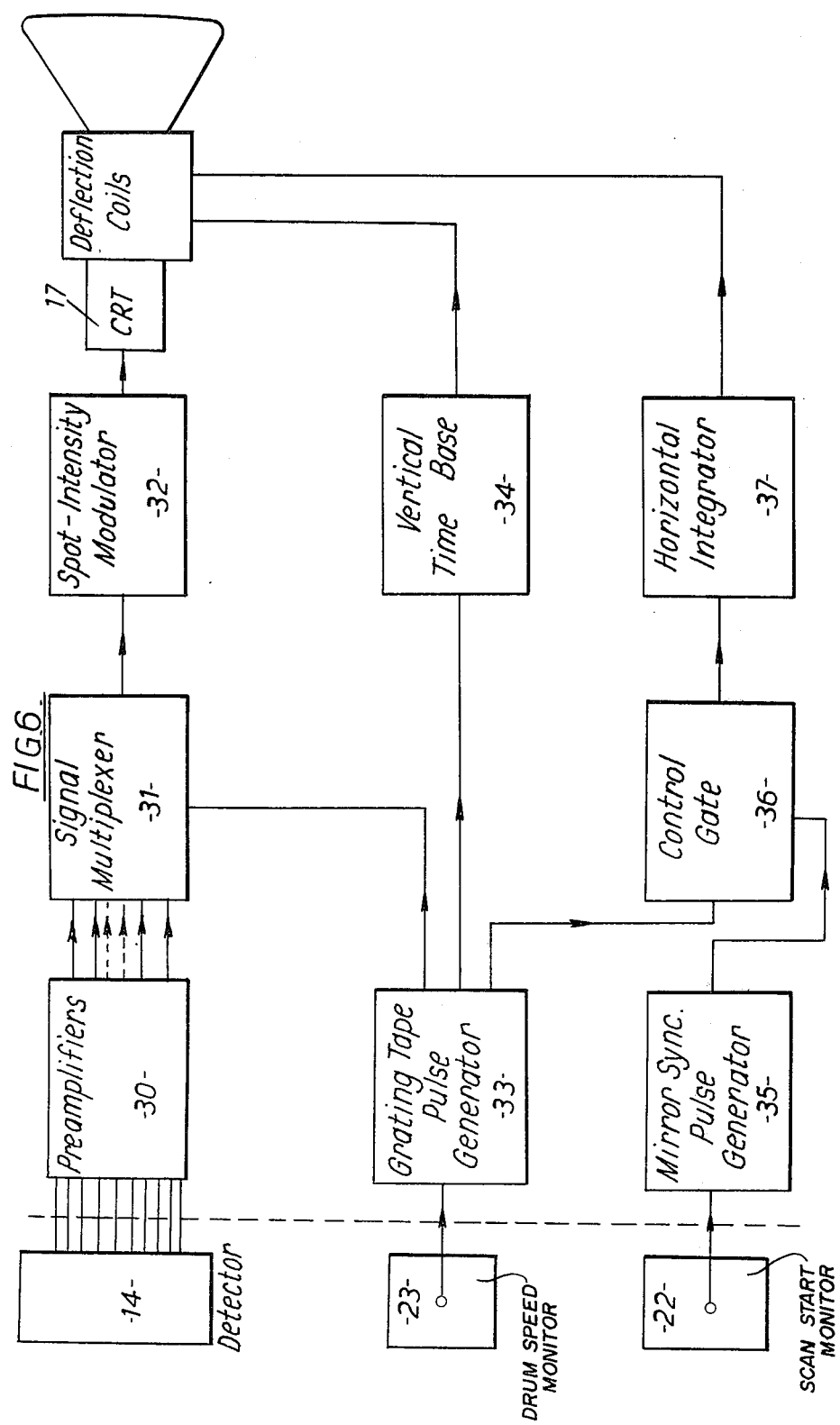

OPTICAL SCANNING SYSTEMS

This invention relates to optical scanning systems.

A known optical scanning system comprises a scanning head incorporating a stationary linear array of radiationdetecting elements and a rotatable member arranged to scan radiation emanating from a field of view onto the array, the output signals from the array being sampled sequentially by a multiplexer and fed to a cathode ray tube (CRT) for visual presentation of the field of view. In this system the rotatable member is designed and controlled to rotate at an accurately constant speed, the multiplexer is timed from a fixed frequency oscillator and the time bases for the horizontal and vertical spot-deflection coils of the CRT are invariable. A signal output from the rotatable member upon commencement of a scan of the field of view causes initiation of the signal multiplexer and of the CRT time bases.

This known form of scanning system relies upon the speed of the rotatable scanning member remaining accurately constant to provide a visual display which is undistorted and to achieve this the rotatable member has sufficient angular momentum to render the effect of retarding couples insignificant. In the event of rotational speed not being maintained constant the visual presentation on the CRT becomes optically distorted both in shape and in clarity.

It is an object of the present invention to provide an improved form of optical scanning system.

According to the present invention there is provided an optical scanning system comprising a scanning head incorporating an array of radiation-detecting elements, a rotatable member arranged to scan radiation entering the head along a predetermined line of sight onto the said array, and a visual display system coupled to the output of the array, said visual display system incorporating a signal multiplexer coupled sequentially to sample the signal outputs of the detecting elements in the array, and a scanned raster device having a spot-intensity modulator coupled to the output of the multiplexer, the raster for said device being generated by first and second time bases of which the first time base is timed to operate in synchronism with the signal multiplexer and the rotatable member co-operates with synchronising means coupled to control the second time base in relation to the speed of rotation of the rotatable member.

Preferably the signal multiplexer receives an initiating signal from said synchronising means.

Preferably also, the synchronising means comprises a reflection grating on said rotatable member, a source of light, a condensing lens system, a focussing reflector, a semi-reflector and a photo-electric detector, the arrangement being such that the detector is located to produce an output in response to a moire fringe pattern which is produced by superimposition of an image of the reflection grating on the reflection grating.

Alternatively said synchronising means may comprise a prerecorded magnetic tape and a pick-up head arranged to output a train of signals indicative of angular position of the rotatable member. In other forms the synchronising means may include an electrical current conducting path of zig-zag formation and a magnetic pick-up head; glass gratings for forming moire fringes; a capacitive device adapted to alternate the value of capacitance between two levels at a pick-up head; or a tacho generator.

In order to scan the radiation onto the array of detector elements the rotatable member may carry a number of reflectors, prisms or lenses.

Embodiments of the present invention will now be described by way of example with reference to the accompanying drawings, in which:

FIG. 4 shows a second form of scanning head which can be used in the system of FIG. 1;

FIG. 5 is a sectional view taken on the lines 5—5 of FIG. 4; and

FIG. 6 is a block diagram of one form of visual display system which can be used in the system of FIG. 1.

Figure 1:
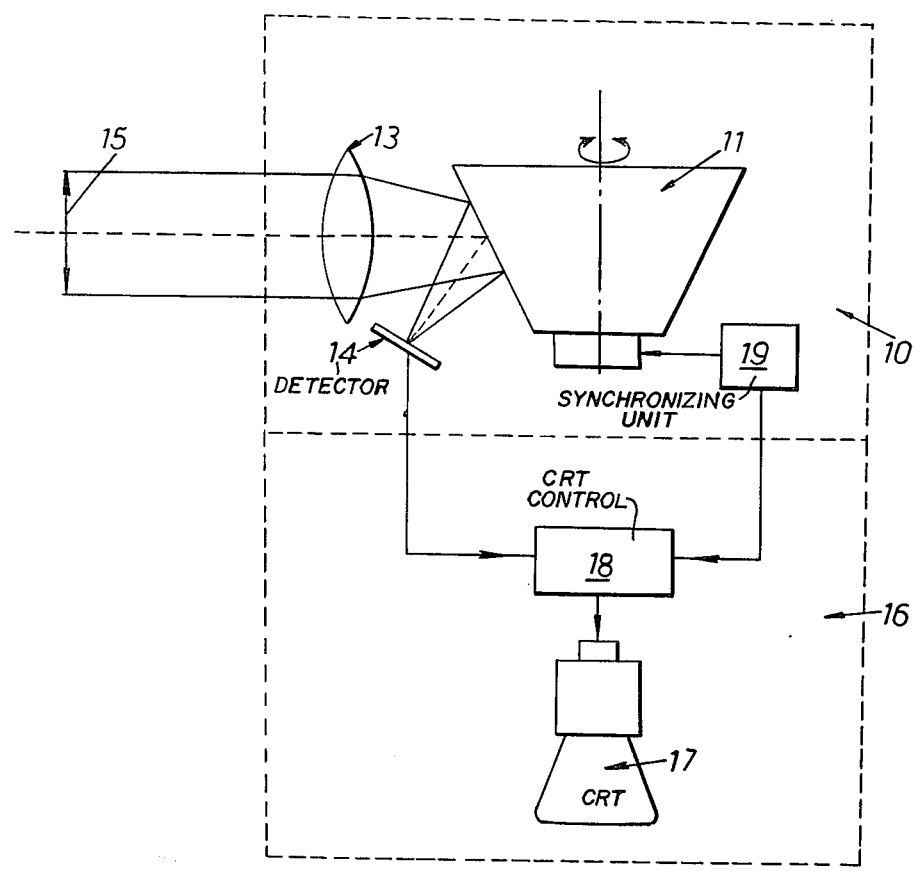
FIG. 1 is a schematic diagram of an optical scanning system according to the present invention.

As is shown in FIG. 1 of the drawings an optical scanning system comprises a scanning head 10 which incorporates a rotatable member 11 supporting one or more mirrors from which radiation entering the head 10 through a focussing lens 13 is reflected onto an array of detector elements linearly arranged to form a detector 14. The member 11 is rotated by a mechanical drive which, conveniently, is in the form of an electric motor (not shown) and is controlled to rotate at a sensibly constant speed.

The detector 14 is preferably sensitive to radiation in the infra-red waveband and hence the system is capable of detecting thermal images from an object 15.

In order to present the image visually the scanning system includes a visual display system 16 incorporating a scanned raster device in the form of a cathode ray tube (CRT) 17. The CRT 17 is controlled by a unit 18 which is coupled to receive the outputs from the detector 14 and from a synchronising control device 19 within the head 10.

Figure 2:
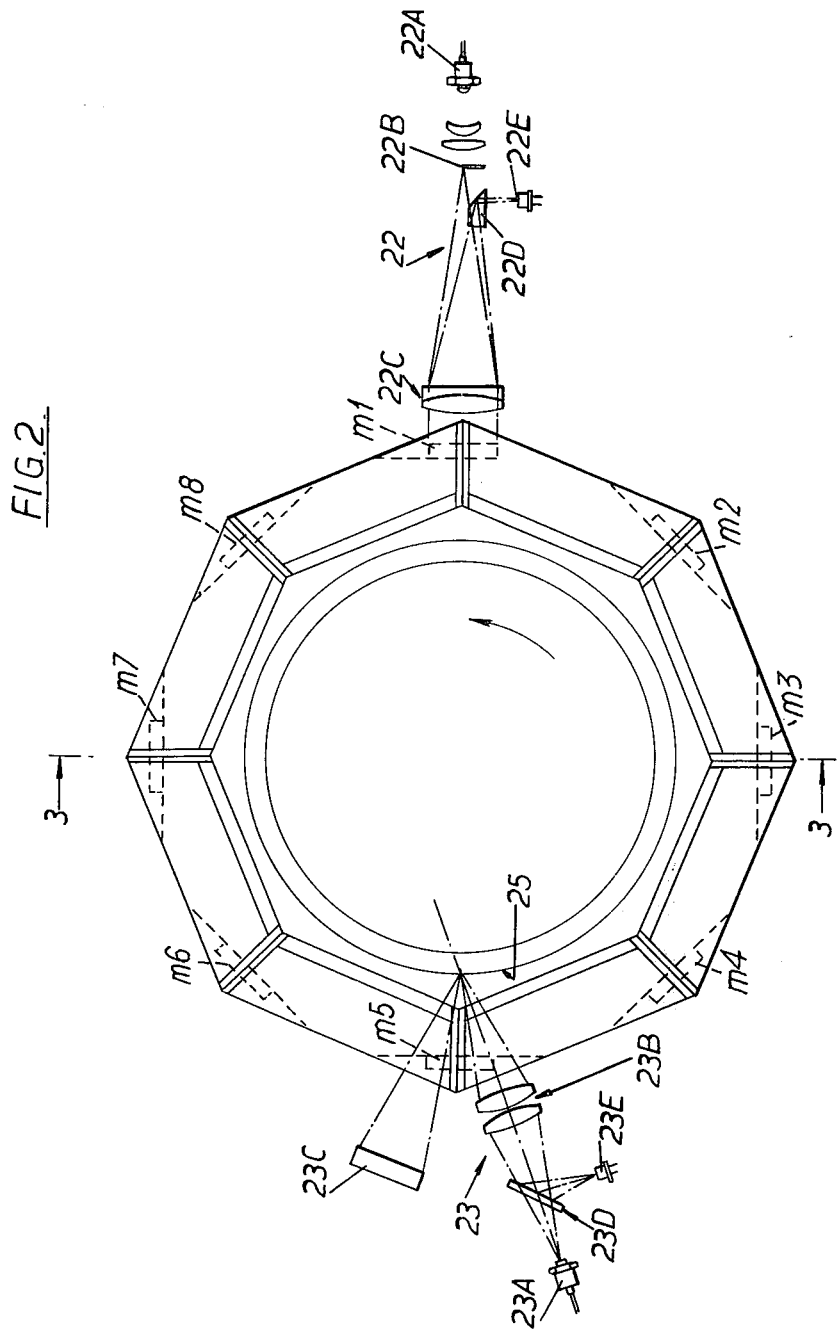
FIG. 2 shows a first form of scanning head which can be used in the system of FIG. 1.
Figure 3:
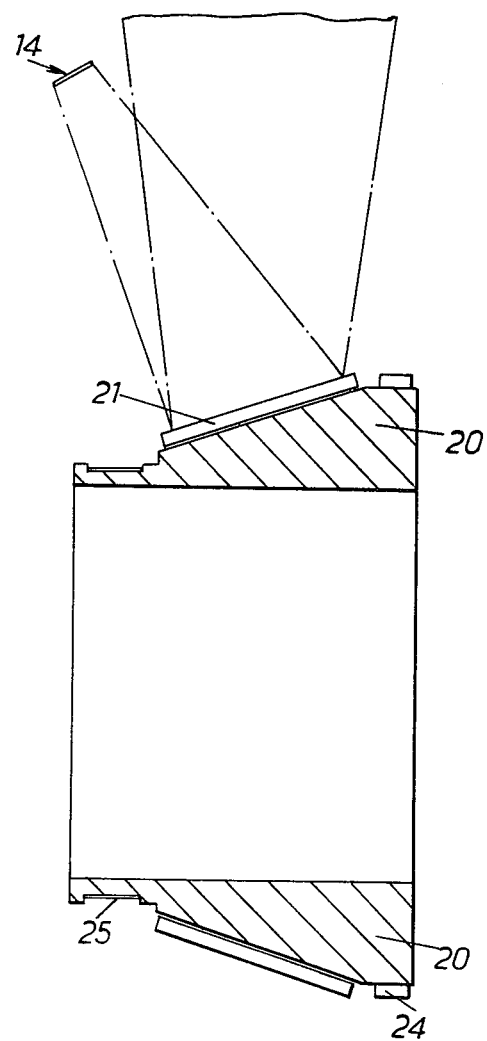
FIG. 3 is a sectional view taken on the lines 3—3 of FIG. 2.

The form of head 10 which is depicted in FIGS. 2 and 3 of the drawings comprises a hollow drum 20 on the outer periphery of which are located eight reflecting surfaces or mirrors 21 forming a regular octagon having its axis coincident with the axis of the drum 20 and radiation received from the object 15 is reflected sequentially from the mirrors 21 to the detector 14, each mirror 21 scanning the image-forming radiation across the individual elements of the detector 14.

In order to synchronise the visually presented representation of the image on the CRT 17 with the scanning rate resulting from rotation of the drum 20 the control device 19 of FIG. 1 is embodied, in FIG. 2, in the form of first and second reading units 22, 23. The unit 22 comprises a light source 22A, a knife-edge device 22B, colimating lens 22C, reflector 22D and photo-electric sensor 22E. The image of the knife-edge formed by the lens 22C is transmitted towards the drum 20 and, intermittently, is reflected towards the sensor 22E from one of eight mirrors 24 mounted on the external periphery of the drum 20 at the junction between adjoining ones of the mirrors 21. Thus, in operation, the sensor 22E is caused to emit signals indicative of the commencement of the scanning motion of each of the mirrors 21 with respect to the image-forming radiation.

The second reading head 23 comprises a light source 23A, condenser lens system 23B, a spherical concave mirror 23C, a partially reflecting mirror 23D and a photo-electric detector 23E. The light emitted by the source 23A is focussed by the lens system 23B onto a reflection grating tape 25 carried around the outer periphery of the drum 20 and the reflected image of a portion of the grating is re-imaged back by the mirror 23C to coincide with the actual tape 25. As a result a moire fringe pattern is formed between the actual grating on the tape 25 and the image thereof and this moire fringe pattern is directed by the mirror 23D to be detected by the detector 23E which provides an output in the form of a pulse train. The pulse train results because, in the case of a grating tape 25 having lines etched thereon, when the illuminated lines of the image grating coincide with the reflecting lines of the actual grating a maximum reflection of energy occurs and this corresponds to a bright fringe, but when the illuminated lines of the image grating coincide with the etched lines of the grating the energy is scattered and a dark fringe is formed. Also, because the movements of the actual grating and of the image thereof are in opposite directions the moire fringes formed move at twice the speed of the grating tape 25.

A second form of scanning head 10 is illustrated in FIGS. 4 and 5 and the main difference from the embodiment of FIGS. 2 and 3 is that the scanning mirrors 21 of FIG. 2 are replaced by internally mounted mirrors 29 in FIG. 4.

In FIG. 6 the visual display system 16 is shown in block diagram form, including a preamplifier 30 having channels equal in number to the elements of the detector 14 and outputing from each channel a signal to a multiplexer 31 which in turn controls the spot-intensity modulator 32 for the CRT 17 at each instant in time. The multiplexer 31, which is self resetting, operates sequentially to sample the signals at the output of each of the channels of the preamplifier 30 and is initiated by a pulse from a control unit 33. Simultaneously, a pulse is emitted from the unit 33 to initiate operation of a vertical time base unit 34 which drives the CRT vertical deflection coil to move the spot from the top to the bottom of the screen. At the end of this vertical scan automatic resetting takes place and the unit 34 is returned to an off-state until receipt of a further pulse from the unit 33.

The control unit 33 is connected to the output from the reading head 23 and as such receives a train of pulses but these pulses have a relatively low repetition rate in comparison to the operating speed of the multiplexer 31. In order to compensate for the frequency doubling effects of the moire fringe generation the unit 33 incorporates a divide by two circuit.

The output from the reading head 22 is fed to a drive circuit 35 which controls the operation of a gate 36 and on receipt of a signal from the head 22 the gate 36 is opened and this permits pulses from the unit 33 to drive the horizontal integrator unit 37 which in turn drives the horizontal deflection coil of the CRT 17. Each such pulse fed to the unit 37 produces an equal increment in the output signal level of the unit 37 and consequently the horizontal position of the spot is indexed from left to right across the CRT 17. These horizontal position increments correspond to different angular positions of each scanning mirror 21 and consequently a complete frame is provided on the CRT 17 from the scanning action of a single mirror 21 and is dependent upon angular position of the mirror 21 which is constantly monitored.

On completion of a complete frame on the CRT 17 the integrator 37 automatically resets, the gate 36 closes and remains so until receipt of a further pulse from the head 22 denoting commencement of a further scan by the succeeding mirror 21.

By virtue of the present invention it is possible to provide an optical display on the CRT which is undistorted in shape because the horizontal time-base integrator is driven by a signal emanating from the scanning head itself so that if the angular speed of the head is caused to vary the CRT presentation remains registered with the radiation actually being sampled by the array of detector elements. Furthermore because the multiplexer and vertical time bases are each triggered from the scanning head the presentation of information on the CRT display is maintained evenly distributed.

Also, by virtue of the present invention it is possible to increase the signal to noise ratio of the detector output to thereby obtain increased temperature resolution in thermally-produced images because utilising a detector 14 having two hundred detecting elements it is possible to drive the member 11 of FIG. 1 at a low speed of, say, 200 r.p.m. and still maintain synchronism between the scanned image and the visual display. Due to the provision of eight scanning mirrors flicker on the visual display can be reduced to become imperceptible. Furthermore, the FIG. 4 embodiment permits a compact system to be designed to incorporate a tape diameter of about 160 mm.

Although the described embodiments disclose the two reading heads 22, 23 mutually diametrically disposed, and also angularly displaced from the instantaneously effective scanning mirror 21 it is envisaged that the two heads 22, 23 could be mutually adjacent and they could be adjoining the instantaneously effective scanning mirror 21.

The grating tape 25 requires to have its joint in a dead area between two scanning mirrors, at a point where the field of view is not being scanned.

What is claimed is:

1. An optical scanning system comprising a scanning head incorporating a linear array of radiation-detecting elements, a rotatable member arranged to scan radiation entering the head along a predetermined line of sight across the said array, and a visual display system coupled to the output of the array, said visual display system incorporating a signal multiplexer coupled sequentially to sample the signal outputs of the detecting elements in the array, and a scanned raster device having a spot-intensity modulator coupled to the output of the multiplexer, the raster for said device being generated by first and second time bases of which the first time base provides movement of the spot in a first direction corresponding to the longitudinal axis of the linear array of detecting elements and is gated to operate in synchronism with the signal multiplexer and the rotatable member cooperates with synchronizing means coupled to control the second time base to move the spot in a second direction at a rate determined by the speed of rotation of the rotatable member.

2. An optical scanning system as claimed in claim 1, wherein said synchronising means comprises a reflection grating on said rotatable member, a source of light, a condensing lens system, a focussing reflector, a semi-reflector and a photo-electric detector, the arrangement being such that the detector is located to produce an output in response to a moire fringe pattern which is produced by superimposition of an image of the reflection grating on the actual reflection grating.

3. An optical scanning system as claimed in claim 2, wherein the synchronising means includes a further photo-electric detector arranged to emit a signal indicative of initiation of a scan of said radiation by said rotatable member.

4. An optical scanning system as claimed in claim 1, wherein said rotatable member includes a plurality of reflective members arranged sequentially to scan said radiation.

5. An optical scanning system as claimed in claim 4, wherein said rotatable member carries said reflective members on the outer periphery thereof.

6. An optical scanning system as claimed in claim 4, wherein said rotatable member is hollow, said reflective members are inwardly facing and are carried on the inner periphery of the rotatable member.

* * * * *